US012781443B2

(12) United States Patent
Marriott

(10) Patent No.: US 12,781,443 B2
(45) Date of Patent: Nov. 3, 2026

(54) GRIPPING AUTO-ADJUSTING RAIL CLAMP

(71) Applicant: Siemens Mobility Pty Ltd., Bayswater (AU)

(72) Inventor: Dion Marriott, Ferntree Gully (AU)

(73) Assignee: Siemens Mobility Pty Ltd., Bayswater (AU)

(*) Notice: Subject to any disclaimer, the term of this patent is extended or adjusted under 35 U.S.C. 154(b) by 405 days.

(21) Appl. No.: 18/621,933

(22) Filed: Mar. 29, 2024

(65) Prior Publication Data

US 2025/0305219 A1 Oct. 2, 2025

(51) Int. Cl.
*E01B 9/32* (2006.01)
*F16B 2/10* (2006.01)

(52) U.S. Cl.
CPC . *E01B 9/32* (2013.01); *F16B 2/10* (2013.01)

(58) Field of Classification Search
CPC ... E01B 26/00; E01B 9/60; E01B 9/32; F16B 2/10
See application file for complete search history.

(56) References Cited

U.S. PATENT DOCUMENTS 587,775 A * 8/1897 Yockel .................. F16L 3/1066 248/316.5
831,196 A * 9/1906 Tate .......................... E01B 9/32 238/359
1,039,931 A * 10/1912 Guba ........................ E01B 9/60 238/292
1,129,548 A * 2/1915 Buss ......................... E01B 9/60 238/348
1,242,782 A * 10/1917 Doughty ................... E01B 9/32 238/331
1,392,146 A * 9/1921 Grizzle et al. ............ E01B 9/32 238/76
1,408,395 A * 2/1922 Pokorny ................... E01B 9/32 238/339
1,421,457 A * 7/1922 Gregg ....................... E01B 9/32 238/332
1,438,625 A * 12/1922 Ashlock .................... E01B 9/32 238/286

(Continued)

FOREIGN PATENT DOCUMENTS

CN 112180019 A * 1/2021 ............. G01N 30/16
CN 216193688 U 4/2022

(Continued)

*Primary Examiner* — S. Joseph Morano
*Assistant Examiner* — Maxwell L Meshaka

(57) ABSTRACT

An auto adjusting rail clamp that self-adjusts gripping is provided. The rail clamp comprises a fixed jaw which contacts a rail's foot with two points of contact. It comprises a moving jaw that slides at a specific angle to the fixed jaw so as it moves closer to the rail it is forced down on to a top of the rail's foot, thereby providing a third point of contact. It comprises a spring that forces the moving jaw towards the rail and down on to the rail thus maintaining contact and allowing for differing rail foot thicknesses. It comprises a retaining pin that captures the moving jaw to prevent it from fully escaping the rail clamp when the rail clamp is not on the rail. The rail clamp attaches to various rail profiles and sizes by automatically adjusting a closure of two clamping jaws.

18 Claims, 4 Drawing Sheets

(56) References Cited

U.S. PATENT DOCUMENTS

| | | | | | |
|---|---|---|---|---|---|
| 1,449,676 | A * | 3/1923 | Jones | E01B 9/32 238/332 |
| 1,654,699 | A * | 1/1928 | Opatchan | E01B 9/32 238/331 |
| 1,815,044 | A * | 7/1931 | Beebe | E01B 9/32 238/338 |
| 1,833,217 | A * | 11/1931 | Hotchkiss | E01B 9/32 238/362 |
| 1,870,631 | A * | 8/1932 | Keech | E01B 9/32 238/351 |
| 4,213,589 | A * | 7/1980 | Pierron | F16L 3/1041 248/74.1 |
| 4,959,892 | A * | 10/1990 | Wang | F16B 2/10 24/489 |
| 9,897,252 | B2 * | 2/2018 | Brzezicki | B25B 5/068 |
| 10,068,438 | B2 * | 9/2018 | Muntasser | G08B 5/02 |
| 10,634,450 | B1 * | 4/2020 | May | F41C 33/003 |
| 12,371,859 | B2 * | 7/2025 | Grimwade | B61L 3/126 |
| 2013/0212844 | A1 * | 8/2013 | Chen | F16B 2/10 24/505 |
| 2017/0046927 | A1 * | 2/2017 | Muntasser | G08B 5/02 |
| 2017/0051871 | A1 * | 2/2017 | Brzezicki | B25B 5/16 |
| 2022/0235520 | A1 * | 7/2022 | Grimwade | E01B 9/60 |
| 2025/0305219 | A1 * | 10/2025 | Marriott | E01B 9/32 |
| 2025/0334145 | A1 * | 10/2025 | Dileo | F16B 2/10 |

FOREIGN PATENT DOCUMENTS

| | | | | |
|---|---|---|---|---|
| DE | 202015105394 | U1 * | 12/2015 | B60R 9/10 |
| EP | 0223897 | A1 * | 6/1987 | E01B 9/66 |
| KR | 20160097528 | A * | 8/2016 | A01G 9/1438 |
| WO | WO-2021229326 | A1 * | 11/2021 | A62B 35/0025 |

* cited by examiner

GRIPPING AUTO-ADJUSTING RAIL CLAMP

BACKGROUND

1. Field

Aspects of the present invention generally relate to a rail clamp configured to provide clamping of equipment to a rail of railway tracks where gripping is auto-adjusting.

2. Description of the Related Art

Current clamps are either rail specific so that there must be many different clamps versions to match the variety of different rail profiles and sizes, or the clamps contact at tangents point of the rail so their location with respect to the rail is not repeatably accurate. The clamps also do not grip the rail securely until they are fully assembled so must be held in position by the installer until all fasteners are tightened.

Therefore, an apparatus is then needed to provide a secure, repeatable clamping of equipment to railway tracks with differing rail profiles and sizes.

SUMMARY

Briefly described, aspects of the present invention relate to a gripping auto-adjusting rail clamp that comprises of four parts being a fixed jaw, a moving jaw, a retaining pin and a spring. The rail clamp provides a secure, repeatable clamping of equipment to railway tracks with differing rail profiles and sizes. A rail clamp provides a secure clamping on to a rail with repeatable accuracy. It will attach to various profiles and sizes by automatically adjusting the closure of the clamping jaws. The clamp will even attach to worn or corroded rail. It can be installed by one person with minimum effort and tools. It will not fall off or move out of position during installation process and can be made permanent or semi-permanent by fitting of a bolt and a nut.

In accordance with one illustrative embodiment of the present invention, a rail clamp is configured to provide clamping of equipment to a rail of railway tracks. The rail clamp comprises a fixed jaw which contacts a bottom and a side of a rail's foot for locating the rail clamp with respect to a rail's vertical axis and a rail's horizontal axis with two points of contact, a moving jaw that slides at a specific angle to the fixed jaw so as it moves closer to the rail it is forced down on to a top of the rail's foot, thereby providing a third point of contact to ensure stability, a spring that forces the moving jaw towards the rail and down on to the rail thus maintaining contact and allowing for differing rail foot thicknesses and a retaining pin as a feature that captures the moving jaw to prevent it from fully escaping the rail clamp when the rail clamp is not on the rail. The rail clamp attaches to various rail profiles and sizes by automatically adjusting a closure of two clamping jaws, i.e. the fixed jaw and the moving jaw.

In accordance with one illustrative embodiment of the present invention, a method of providing a rail clamp configured to provide clamping of equipment to a rail of railway tracks is provided. The method comprises providing a fixed jaw which contacts a bottom and a side of a rail's foot for locating the rail clamp with respect to a rail's vertical axis and a rail's horizontal axis with two points of contact, providing a moving jaw that slides at a specific angle to the fixed jaw so as it moves closer to the rail it is forced down on to a top of the rail's foot, thereby providing a third point of contact to ensure stability, providing a spring that forces the moving jaw towards the rail and down on to the rail thus maintaining contact and allowing for differing rail foot thicknesses and providing a retaining pin as a feature that captures the moving jaw to prevent it from fully escaping the rail clamp when the rail clamp is not on the rail. The rail clamp attaches to various rail profiles and sizes by automatically adjusting a closure of two clamping jaws, i.e. the fixed jaw and the moving jaw.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Figure 1:
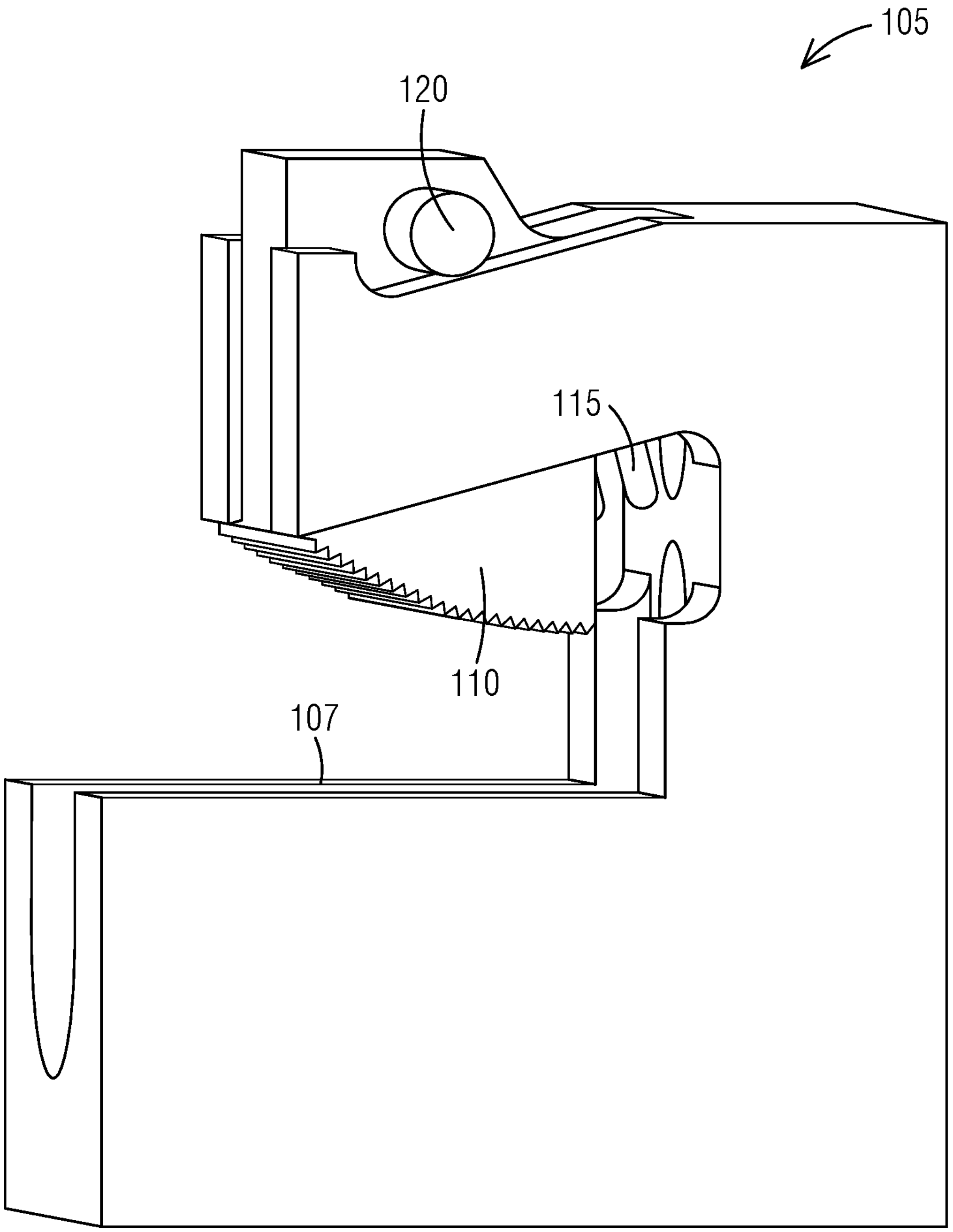
FIG. 1 illustrates a gripping auto-adjusting rail clamp in accordance with an embodiment of the present invention.

Various technologies that pertain to systems and methods that provide a gripping auto-adjusting rail clamp. The rail clamp is spring-loaded and attaches anywhere along a side of a rail in a horizontal position. It has an ability to extend in grip by pressing a moving jaw with a spring-loaded pin. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

To facilitate an understanding of embodiments, principles, and features of the present invention, they are explained hereinafter with reference to implementation in illustrative embodiments. In particular, they are described in the context of a gripping auto-adjusting rail clamp. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of the system are provided for providing a gripping auto-adjusting rail clamp according to the present disclosure are described below with reference to FIG. 1 herein. The drawing is not necessarily drawn to scale.

Consistent with an embodiment of the present invention, FIG. 1 represents a gripping auto-adjusting rail clamp 105 for use in clamping of equipment to a rail of railway tracks in accordance with an embodiment of the present invention. The rail clamp 105 is spring-loaded and attaches anywhere along a side of a rail in a horizontal position. It has an ability to extend in grip by pressing a moving jaw with a spring-loaded pin. The rail clamp 105 provides a secure, repeatable clamping of equipment to railway tracks with differing rail profiles and sizes. The rail clamp 105 provides a secure clamping on to a rail with repeatable accuracy. It will attach to various profiles and sizes by automatically adjusting the closure of the clamping jaws. The rail clamp 105 will even attach to worn or corroded rail. It can be installed by one person with minimum effort and tools. It will not fall off or move out of position during installation process and can be made permanent or semi-permanent by fitting of a bolt and a nut.

Figure 2:
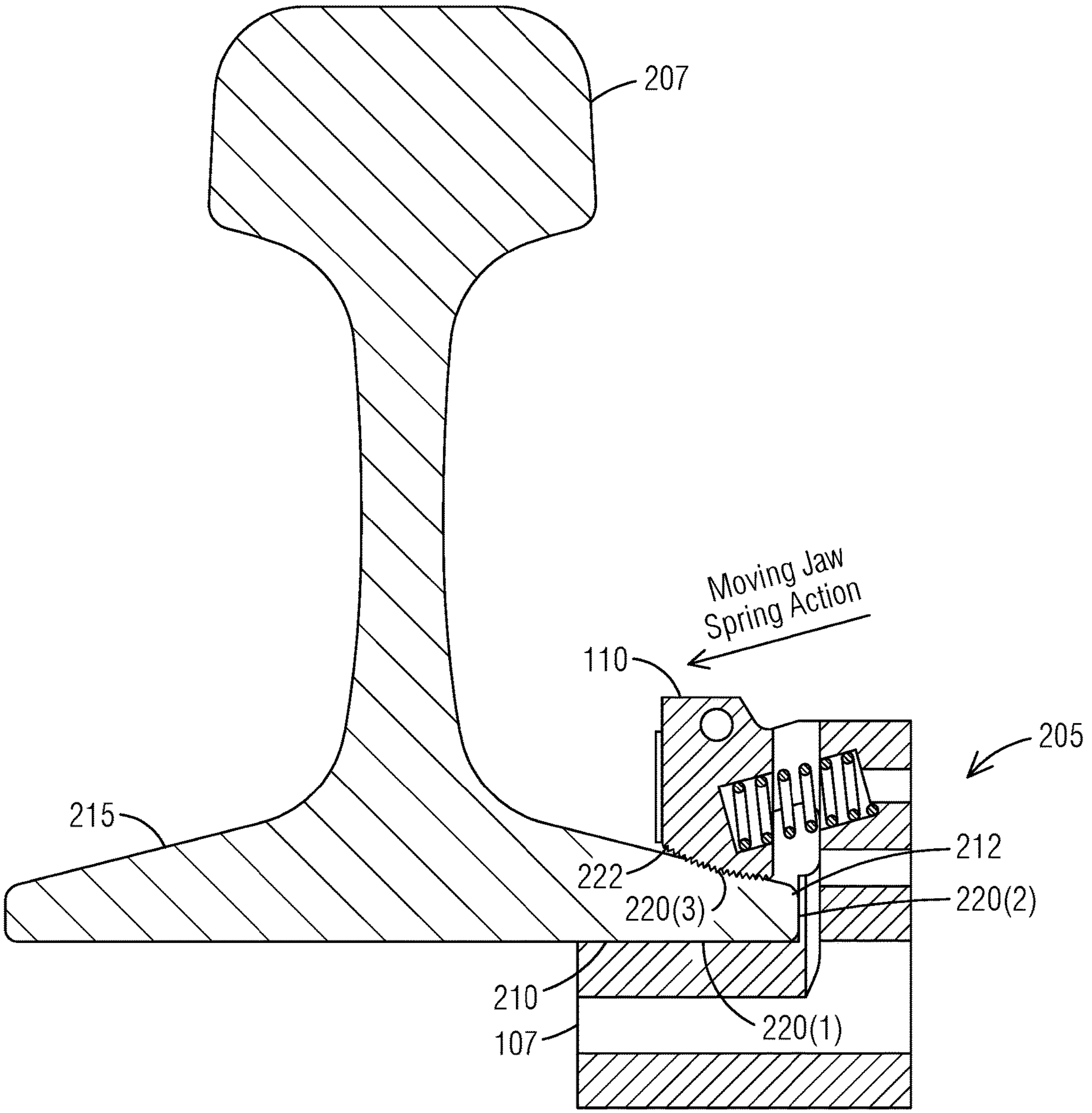
FIG. 2 illustrates a rail clamp in situ on a rail in accordance with an embodiment of the present invention.

The rail clamp 105 comprises a fixed jaw 107 which contacts a bottom (see FIG. 2) and a side (see FIG. 2) of a rail's foot (see FIG. 2) for locating the rail clamp 105 with respect to a rail's vertical axis and a rail's horizontal axis with two points of contact (see FIG. 2). The rail clamp 105 further comprises a moving jaw 110 that slides at a specific angle to the fixed jaw 107 so as it moves closer to the rail it is forced down on to a top of the rail's foot, thereby providing a third point of contact (see FIG. 2) to ensure stability. The rail clamp 105 further comprises a spring 115 that forces the moving jaw 110 towards the rail and down on to the rail thus maintaining contact and allowing for differing rail foot thicknesses. The rail clamp 105 further comprises a retaining pin 120 as a feature that captures the moving jaw 110 to prevent it from fully escaping the rail clamp 105 when the rail clamp 105 is not on the rail. The rail clamp 105 attaches to various rail profiles and sizes by automatically adjusting a closure of two clamping jaws, i.e. the fixed jaw 107 and the moving jaw 110.

Referring to FIG. 2, it illustrates a rail clamp 205 in situ on a rail 207 in accordance with an embodiment of the present invention. The rail clamp 205 comprises the fixed jaw 107 which contacts a bottom 210 and a side 212 of a rail's foot 215 for locating the rail clamp 105 with respect to a rail's vertical axis and a rail's horizontal axis with two points of contact 220(1-2). The rail clamp 205 further comprises the moving jaw 110 that slides at a specific angle to the fixed jaw 107 so as it moves closer to the rail 207 it is forced down on to a top of the rail's foot 215, thereby providing a third point of contact 220(3) to ensure stability.

The moving jaw 110 having a radiused contact face 222 which ensures a tangential contact with various rail profiles and sizes. The specific angle (greater than a maximum angle of a rail profile) at which the moving jaw 110 can slide causing it to bear down more firmly on to the rail 207 if the fixed jaw 107 begins to slide off, resulting in clamping more firmly on to the rail 207. The rail clamp 205 will maintain its position on the rail 207 unless it is removed by retracting the moving jaw 110 against the spring 115 or when a sufficiently large displacing force is applied to the rail clamp 205.

Figure 3:
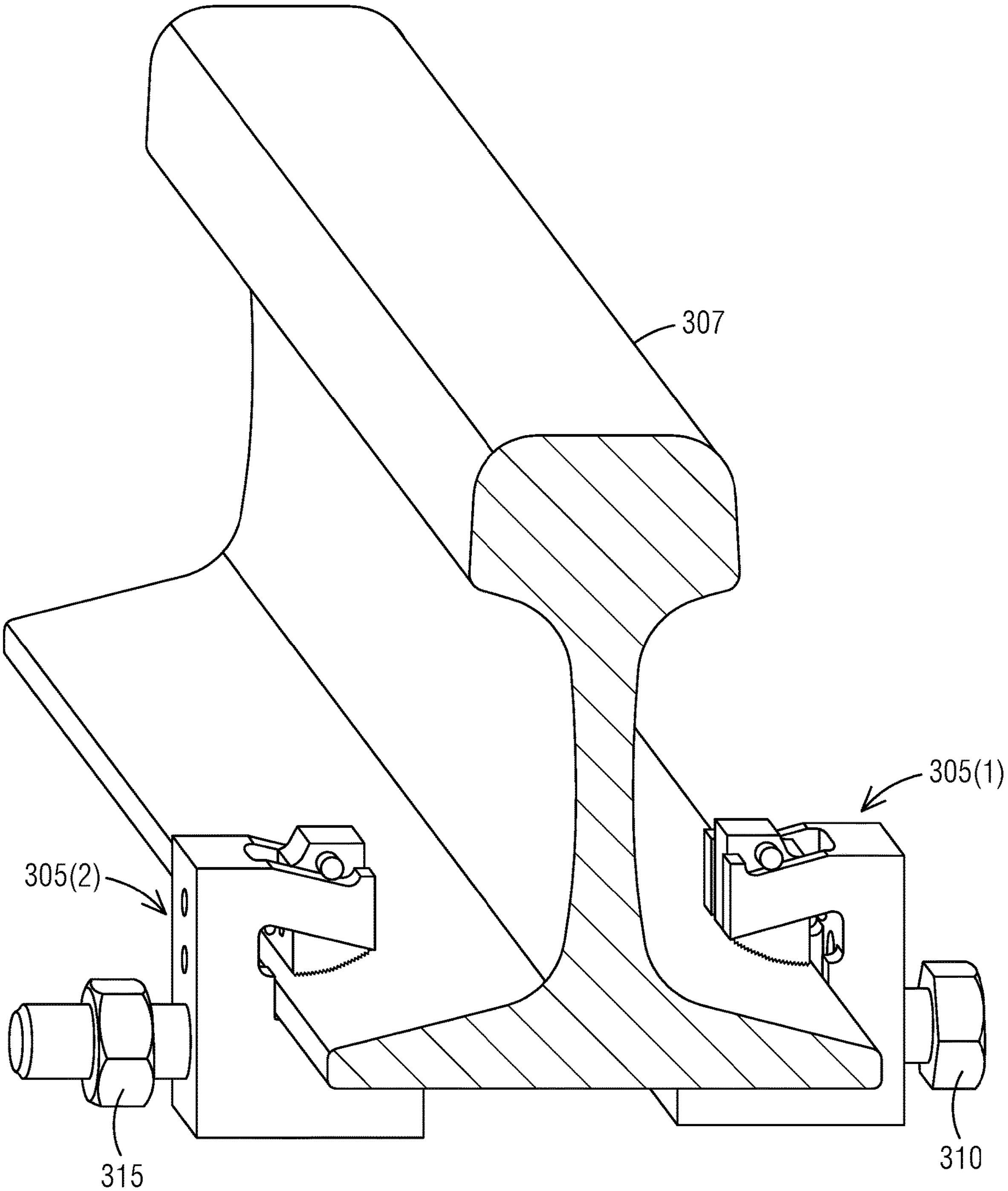
FIG. 3 illustrates permanent or semi-permanent installation of a rail clamp on a rail in accordance with an embodiment of the present invention.

For permanent and semi-permanent installations, a second rail clamp (not shown) can be positioned on an opposite side of the rail 207 and a bolt is passed through both and secured with a nut (see FIG. 3).

The rail clamp 205 is an auto adjusting rail clamp that self-adjusts gripping to provide secure, repeatable clamping of equipment to the railway tracks with differing rail profiles and sizes.

The rail clamp 205 grips the rail 207 securely without being fully assembled so doesn't need to be held in a position by an installer until all fasteners are tightened. The rail clamp 205 provides a secure clamping on to the rail 207 with a repeatable accuracy. The rail clamp 205 can be installed by one person with minimum effort and tools. The rail clamp 205 will not fall off or move out of a position during an installation process and can be made permanent or semi-permanent by fitting of a bolt and a nut.

Turning now to FIG. 3, it illustrates permanent or semi-permanent installation of a first rail clamp 305(1) and a second rail clamp 305(2) on a rail 307 in accordance with an embodiment of the present invention. For permanent and semi-permanent installations, the second rail clamp 305(2) is positioned on the opposite side of the rail 307 and a bolt 310 is passed through both and secured with a nut 315.

Figure 4:
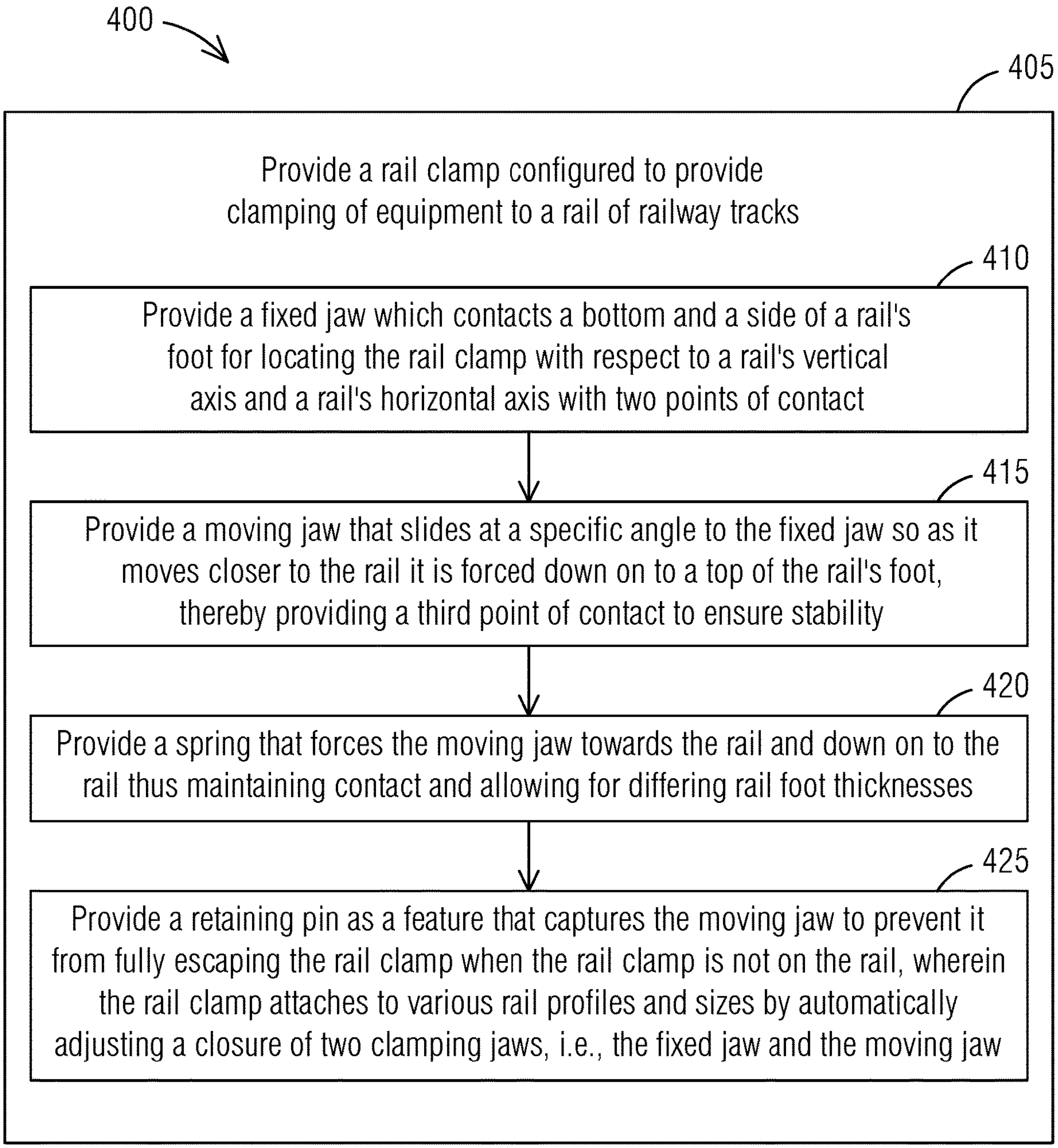
FIG. 4 illustrates a method of providing a rail clamp configured to provide clamping of equipment to a rail of railway tracks in accordance with an embodiment of the present invention.

FIG. 4 illustrates a method 400 of providing the rail clamp (105, 205, 305(1-2)) in accordance with an embodiment of the present invention. Reference is made to the elements and features described in FIGS. 1-3. It should be appreciated that some steps are not required to be performed in any particular order, and that some steps are optional.

The method 400 comprises a step 405 of providing a gripping auto-adjusting rail clamp configured to provide clamping of equipment to a rail of railway tracks. The step 405 of the method 400 further comprises a step 410 of providing a fixed jaw which contacts a bottom and a side of a rail's foot for locating the rail clamp with respect to a rail's vertical axis and a rail's horizontal axis with two points of contact.

The method 400 further comprises a step 415 of providing a moving jaw that slides at a specific angle to the fixed jaw so as it moves closer to the rail it is forced down on to a top of the rail's foot, thereby providing a third point of contact to ensure stability. The method 400 further comprises a step 420 of providing a spring that forces the moving jaw towards the rail and down on to the rail thus maintaining contact and allowing for differing rail foot thicknesses. The method 400 further comprises a step 425 of providing a retaining pin as a feature that captures the moving jaw to prevent it from fully escaping the rail clamp when the rail clamp is not on the rail, wherein the rail clamp attaches to various rail profiles and sizes by automatically adjusting a closure of two clamping jaws, i.e. the fixed jaw and the moving jaw.

While a rail clamp based on a spring-loaded pin is described here a range of one or more other systems are also contemplated by the present invention. For example, other systems may be implemented based on one or more features presented above without deviating from the spirit of the present invention.

The techniques described herein can be particularly useful for any multi-contact rail clamp. While particular embodiments are described in terms of three contact design, the techniques described herein are not limited to such three contact design but can also be used with other number of contacts.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

The invention claimed is:

1. A rail clamp configured to provide clamping of equipment to a rail of railway tracks, the rail clamp comprising:

a fixed jaw which contacts a bottom and a side of a rail's foot for locating the rail clamp with respect to a rail's vertical axis and a rail's horizontal axis with two points of contact;

a moving jaw that slides at a specific angle to the fixed jaw so as the fixed jaw moves closer to the rail the fixed jaw is forced down on to a top of the rail's foot, thereby providing a third point of contact to ensure stability;

a spring that forces the moving jaw towards the rail and down on to the rail thus maintaining contact and allowing for differing rail foot thicknesses; and a retaining pin as a feature that captures the moving jaw to prevent the moving jaw from fully escaping the rail clamp when the rail clamp is not on the rail, wherein the rail clamp attached to various rail profiles and sizes by automatically adjusting a closure of the fixed jaw and the moving jaw.

2. The rail clamp of claim 1, wherein the moving jaw having a radiused contact face which ensures a tangential contact with various rail profiles and sizes.

3. The rail clamp of claim 1, wherein the specific angle, which is greater than a maximum angle of a rail profile, at which the moving jaw can slide causing it to bear down more firmly on to the rail if the fixed jaw begins to slide off, resulting in clamping more firmly on to the rail.

4. The rail clamp of claim 3, wherein the rail clamp will maintain its position on the rail unless the rail clamp is removed by retracting the moving jaw against the spring or when a sufficiently large displacing force is applied to the rail clamp.

5. The rail clamp of claim 1, wherein for permanent and semi-permanent installations, a second rail clamp can be positioned on an opposite side of the rail and a bolt is passed through both and secured with a nut.

6. The rail clamp of claim 1, wherein the rail clamp is an auto adjusting rail clamp that self-adjusts gripping to provide secure, repeatable clamping of equipment to the railway tracks with differing rail profiles and sizes.

7. The rail clamp of claim 6, wherein the rail clamp grips the rail securely without being fully assembled so doesn't need to be held in a position by an installer until all fasteners are tightened.

8. The rail clamp of claim 7, wherein the rail clamp provides a secure clamping on to rail with a repeatable accuracy.

9. The rail clamp of claim 1, wherein the rail clamp will not fall off or move out of a position during an installation process and can be made permanent or semi-permanent by fitting of a bolt and a nut.

10. A method of providing a rail clamp configured to provide clamping of equipment to a rail of railway tracks, the method comprising:

providing a fixed jaw which contacts a bottom and a side of a rail's foot for locating the rail clamp with respect to a rail's vertical axis and a rail's horizontal axis with two points of contact;

providing a moving jaw that slides at a specific angle to the fixed jaw so as the fixed jaw moves closer to the rail the fixed jaw is forced down on to a top of the rail's foot, thereby providing a third point of contact to ensure stability;

providing a spring that forces the moving jaw towards the rail and down on to the rail thus maintaining contact and allowing for differing rail foot thicknesses; and providing a retaining pin as a feature that captures the moving jaw to prevent the moving jaw from fully escaping the rail clamp when the rail clamp is not on the rail, wherein the rail clamp attached to various rail profiles and sizes by automatically adjusting a closure of the fixed jaw and the moving jaw.

11. The method of claim 10, wherein the moving jaw having a radiused contact face which ensures a tangential contact with various rail profiles and sizes.

12. The method of claim 10, wherein the specific angle, which is greater than a maximum angle of a rail profile, at which the moving jaw can slide causing it to bear down more firmly on to the rail if the fixed jaw begins to slide off, resulting in clamping more firmly on to the rail.

13. The method of claim 12, wherein the rail clamp will maintain its position on the rail unless the rail clamp is removed by retracting the moving jaw against the spring or when a sufficiently large displacing force is applied to the rail clamp.

14. The method of claim 10, wherein for permanent and semi-permanent installations, a second rail clamp can be positioned on an opposite side of the rail and a bolt is passed through both and secured with a nut.

15. The method of claim 10, wherein the rail clamp is an auto adjusting rail clamp that self-adjusts gripping to provide secure, repeatable clamping of equipment to the railway tracks with differing rail profiles and sizes.

16. The method of claim 15, wherein the rail clamp grips the rail securely without being fully assembled so doesn't need to be held in a position by an installer until all fasteners are tightened.

17. The method of claim 16, wherein the rail clamp provides a secure clamping on to rail with a repeatable accuracy.

18. The method of claim 10, wherein the rail clamp will not fall off or move out of a position during an installation process and can be made permanent or semi-permanent by fitting of a bolt and a nut.

* * * * *